US010135352B2

(12) United States Patent
Fujii

(10) Patent No.: US 10,135,352 B2
(45) Date of Patent: Nov. 20, 2018

(54) CONTROLLER FOR POWER CONVERTER WITH FREQUENCY MODULATED CARRIER

(71) Applicant: Fuji Electric Co., Ltd., Kanagawa (JP)

(72) Inventor: Kansuke Fujii, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/063,097

(22) Filed: Mar. 7, 2016

(65) Prior Publication Data
US 2016/0308459 A1 Oct. 20, 2016

(30) Foreign Application Priority Data
Apr. 15, 2015 (JP) .................................. 2015-082924

(51) Int. Cl.
*H02M 7/217* (2006.01)
*H02M 5/458* (2006.01)
*H02M 1/12* (2006.01)

(52) U.S. Cl.
CPC ........... *H02M 5/4585* (2013.01); *H02M 1/12* (2013.01); *H02M 1/126* (2013.01); *H02M 7/2173* (2013.01); *H02M 2001/123* (2013.01)

(58) Field of Classification Search
CPC ................ H02M 7/217; H02M 1/126; H02M 2001/123; H02M 5/4585; H02M 1/12; H02M 7/2173; H02M 2005/2932; H02M 7/06; H02M 7/10; H02M 7/44; H02M 7/48; H02M 1/4208; H02M 1/14; H02M 5/40; H02M 5/451; H02M 5/458
See application file for complete search history.

(56) References Cited

U.S. PATENT DOCUMENTS

| 5,088,297 A | 2/1992 | Maruyama et al. |
| 5,990,654 A * | 11/1999 | Skibinski .............. H02M 1/126 307/105 |
| 2008/0089102 A1 * | 4/2008 | Hayami ............ H02M 7/53871 363/74 |

(Continued)

FOREIGN PATENT DOCUMENTS

| JP | H7-167480 A | 7/1995 |
| JP | 2000-184731 A | 6/2000 |
| JP | 5353543 B2 | 11/2013 |

*Primary Examiner* — Gustavo Rosario Benitez
(74) *Attorney, Agent, or Firm* — Chen Yoshimura LLP

(57) ABSTRACT

The present disclosure provides a controller for a power converter that converts input power to a prescribed form and outputs the power by switching a semiconductor switching device ON and OFF and that has an output circuit including a filtering reactor on an output side, the controller including: a carrier calculating unit that generates a carrier having prescribed frequencies for generating a control signal that switches the semiconductor switching device ON and OFF, wherein the carrier calculating unit generates the carrier such that a carrier frequency at phase angles where ripple components in a current flowing through the reactor are relatively high in magnitude, which is defined as a high ripple carrier frequency, is higher than a carrier frequency at phase angles where the ripple components are relatively low in magnitude, which is defined as a low ripple carrier frequency.

7 Claims, 11 Drawing Sheets

(56) References Cited

U.S. PATENT DOCUMENTS

| | | | | |
|---|---|---|---|---|
| 2010/0128502 A1* | 5/2010 | Kawamoto | ............ | B60L 11/00 |
| | | | | 363/34 |
| 2010/0164416 A1* | 7/2010 | Yamada | ............ | H02M 1/12 |
| | | | | 318/400.13 |
| 2010/0277149 A1* | 11/2010 | Furutani | ............ | H02M 1/0845 |
| | | | | 323/282 |
| 2011/0168697 A1* | 7/2011 | Kazama | ............ | H05B 6/062 |
| | | | | 219/660 |
| 2013/0221895 A1* | 8/2013 | Kanda | ............ | H02M 1/12 |
| | | | | 318/767 |
| 2013/0300327 A1* | 11/2013 | Sekimoto | ............ | H02M 1/12 |
| | | | | 318/400.23 |
| 2016/0105127 A1* | 4/2016 | Miyake | ............ | H02M 1/44 |
| | | | | 363/97 |

* cited by examiner

US 10,135,352 B2

CONTROLLER FOR POWER CONVERTER WITH FREQUENCY MODULATED CARRIER

BACKGROUND OF THE INVENTION

Technical Field

The present invention relates to a controller for a power converter in which an output unit includes a filtering reactor, the controller having an improved carrier generation scheme for obtaining control signals for semiconductor switching elements of the power converter.

Background Art

FIG. 5 illustrates a power converter in which two uninterruptible power supplies 100A and 100B are connected between a power system 101 and a load 109.

Both uninterruptible power supplies 100A and 100B have the same configuration. Next, the configuration and operation of one of the uninterruptible power supplies 100A will be described.

The uninterruptible power supply 100A converts AC power from the power system 101 to DC power using a rectifier and uses that DC power to charge a battery. The DC power from the battery is then converted back to AC power using an inverter and supplied to a load 109.

The rectifier includes a capacitor 102 and a reactor 103 that form an input filter and a rectifier converter 104 constituted by a power semiconductor switching element. The inverter includes an inverter converter 106 constituted by a power semiconductor switching element and a reactor 107 and a capacitor 108 that form an output filter.

The rectifier converter 104 and the inverter converter 106 are typically single-phase full-bridge circuits or three-phase full-bridge circuits.

FIG. 6 is a block diagram illustrating controllers for the rectifier converter 104 and the inverter converter 106. Note that in the controllers illustrated in FIG. 6, the AC portions are provided for each phase according to the number of phases (single-phase or three-phase) of the rectifier converter 104 and the inverter converter 106 for the power system 101 and the load 109.

First, the configuration and operation of the controller for the rectifier converter 104 will be described.

A voltage detector 202 detects a DC voltage E from a battery 105, and a subtractor 207 calculates the difference between a target DC voltage E* and the detected DC voltage E. A regulator 208 brings the voltage difference to zero, and the output of the regulator 208 is input to a multiplier 209. Furthermore, a voltage detector 201 detects an AC input voltage, and the detected voltage is multiplied with the output of the regulator 208 in the multiplier 209 in order to obtain an input current command.

Next, a subtractor 210 calculates the difference between the input current command and a detected input current from a current detector 204. A regulator 211 brings this current difference to zero, and the output of the regulator 211 is added to the detected input voltage in an adder 212 in order to calculate a rectifier voltage command $\lambda_{REC}$.

Meanwhile, a PLL circuit 214 synchronizes the detected input voltage with the internal phase reference of the controller, and the output of the PLL circuit 214 is input to a carrier calculating unit 215. The carrier calculating unit 215 calculates, according to the output from the PLL circuit 214, a carrier having a frequency that changes in synchronization with the detected input voltage. This carrier is compared to the voltage command $\lambda_{REC}$ in a comparator 213 in order to obtain a logical pulse $PLS_R$. Furthermore, a dead time generator 216 adds a dead time for protecting against arm short-circuits to the logical pulse $PLS_R$ and generates a pulse $PLS_{REC}$, and this pulse $PLS_{REC}$ is output as a signal for switching the semiconductor switching element of the rectifier converter 104 ON and OFF.

FIG. 7 is a block diagram illustrating a configuration of the carrier calculating unit 215.

In the carrier calculating unit 215, an oscillator 10 outputs a fixed-frequency pulse, which is then input to an up/down counter 20. Moreover, the output of the PLL circuit 214 illustrated in FIG. 6 is set as the upper limit for the carrier frequency, and a sign inverter 30 inverts the upper limit and sets the resulting value as the lower limit for the carrier frequency, which is also input to the up/down counter 20. As illustrated in FIG. 7, the up/down counter 20 counts the number of output pulses from the oscillator 10 between the upper limit and the lower limit in order to calculate a carrier with a prescribed frequency.

Next, the configuration and operation of the controller for the inverter converter 106 illustrated in FIG. 6 will be described.

A subtractor 217 calculates the difference between a target output voltage $V_A^*$ calculated by the PLL circuit 214 and a detected output voltage $V_A$ from a voltage detector 203, and this difference is input to a regulator (an output voltage regulator) 218. The regulator 218 brings this voltage difference to zero, and the output of the regulator 218 is input to an adder 219 along with the target output voltage $V_A^*$.

Moreover, an adder 220 adds a detected output current $I_A$ of the local device (the uninterruptible power supply 100A illustrated in FIG. 5) as detected by a current detector 205 to a detected output current $I_B$ of the other device connected in parallel (the uninterruptible power supply 100B illustrated in FIG. 5) in order to calculate a load current. This load current is input to a current command calculating unit 222, which converts the load current to output current commands for each device. A subtractor 223 calculates the difference between the detected output current of the local device and the respective output current command, and this difference is input to a regulator (a load-balancing regulator) 224.

The regulator 224 brings this current difference to zero, and the output of the regulator 224 is sent to the adder 219.

The adder 219 adds together the target output voltage $V_A^*$ and the outputs from the regulators 218 and 224 in order to calculate an inverter voltage command $\lambda_{INV}$. This voltage command $\lambda_{INV}$ is compared to the carrier in a comparator 225 in order to obtain a logical pulse $PLS_I$. Furthermore, a dead time generator 226 adds a dead time to the logical pulse $PLS_I$ and generates a pulse $PLS_{INV}$, and this pulse $PLS_{INV}$ is output as a signal for switching the semiconductor switching element of the inverter converter 106 ON and OFF.

FIG. 8 illustrates the carrier, the voltage command, the logical pulse, and the output pulses that include dead time on the inverter converter 106 side. The relationships between these signals are the same on the rectifier converter 104 side.

Patent Document 1, for example, discloses a power converter that operates using a fixed-frequency carrier as described above. In Patent Document 1, the carrier frequency of a variable operating frequency voltage-type PWM inverter that drives an induction motor for a compressor is fixed to a frequency greater than or equal to 10 kHz.

However, in power converters that use a fixed-frequency carrier, components of the carrier frequency (the switching frequency) are superimposed on the voltage, and therefore as illustrated in FIG. 9, for example, currents that include harmonics flow through the reactors for each phase on the output side (here, the rectifier converter 104 and the inverter converter 106 are both three-phase circuits). FIG. 10 is a graph showing the frequency spectrum of the reactor currents as analyzed using a fast Fourier transform (FFT).

As shown in FIG. 10, the reactor current spectrum exhibits peaks near integer multiples of the carrier frequency (indicated by the dashed vertical lines in FIG. 10), and therefore mid-capacity to high-capacity power converters that utilize a carrier frequency of less than or equal to 10 kHz such as 5 kHz, for example, will generate an audible and unpleasant magnetostrictive noise due to the peaks p' shown in FIG. 10.

Patent Document 2, for example, discloses a technology for randomly changing the carrier frequency in order to reduce such magnetostrictive noise.

FIG. 11 conceptually illustrates the frequency spectrum when the carrier frequency is changed (modulated) at random. This random modulation makes it possible to reduce the magnitude of the peaks in the spectrum.

RELATED ART DOCUMENTS

Patent Documents

Patent Document 1: Japanese Patent Application Laid-Open Publication No. H7-167480 (paragraph [0009], FIG. 8, and the like)

Patent Document 2: Japanese Patent Application Laid-Open Publication No. 2000-184731 (paragraphs [0011], [0012], and [0024] to [0041], FIGS. 4, 6, and 14, and the like)

SUMMARY OF THE INVENTION

When the carrier frequency is fixed, the ripple components in the reactor currents illustrated in FIG. 9 increase in magnitude at phase angles of 0°, 90°, 180°, and 270° in the U-phase, for example. Moreover, using the phase angles of the U-phase as references, the ripple components increase in magnitude in the V-phase at phase angles of 30°, 120°, 210°, and 300° and increase in magnitude in the W-phase at phase angles of 60°, 150°, 240°, and 330°. Note that in FIG. 9, the dot-dashed lines indicate phase angles at which the magnitude of the ripple components increase in all three phases at the same time.

Furthermore, as illustrated in FIG. 10, when an FFT analysis is performed on the reactor currents that include these ripple components, the resulting spectrum exhibits peaks near integer multiples of the carrier frequency. In principle, randomly modulating the carrier frequency to reduce the ripple components as disclosed in Patent Document 2 and spread out the spectrum should make it possible to reduce the magnetostrictive noise.

However, while although randomly changing the carrier frequency makes it possible to spread out the spectrum, in some cases unexpected frequencies may increase the magnitude of the ripple components, thereby decreasing the efficiency and reliability of the device.

Moreover, when the outputs of multiple power converters are connected together directly without using an isolation transformer like in the parallel connection system used for the uninterruptible power supplies 100A and 100B illustrated in FIG. 5, problems such as the following will occur if the carriers for each power converter are not synchronized.

In other words, if the carriers are not synchronized, a common-mode circulating current flows along the following path: the device 100A-side rectifier converter 104→the inverter converter 106→the parallel connection point between the devices 100A and 100B (the point connected to the load 109)→the device 100B-side inverter converter→the rectifier converter→the parallel connection point between the devices 100A and 100B (the point connected to the power system 101). This can increase the potential for operational failures, and depending on the magnitude of the common-mode impedance, this circulating current may grow large enough to damage the power converters.

Therefore, one of the problems to be solved by the present invention is to provide a controller that makes it possible to normalize the ripple components in the reactor currents in order to spread out the frequencies in the frequency spectrum and also makes it possible to decrease the magnitude of peaks in the frequency spectrum in order to reduce magnetostrictive noise.

Another problem to be solved by the present invention is to provide a controller that makes it possible to supply power to a load without causing a circulating current even when using a plurality of power converters connected together in parallel.

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a first aspect, the present disclosure provides a controller for a power converter that converts input power to a prescribed form and outputs the power by switching a semiconductor switching device ON and OFF and that has an output circuit including a filtering reactor on an output side, the controller including: a carrier calculating unit that generates a carrier having prescribed frequencies for generating a control signal that switches the semiconductor switching device ON and OFF, wherein the carrier calculating unit generates the carrier such that a carrier frequency at phase angles where ripple components in a current flowing through the reactor are relatively high in magnitude, which is defined as a high ripple carrier frequency, is higher than a carrier frequency at phase angles where the ripple components are relatively low in magnitude, which is defined as a low ripple carrier frequency.

In a second aspect, the present disclosure provides the power converter controller according to the first aspect, wherein the carrier calculating unit sets an upper limit and a lower limit of the carrier frequency according to a number of phases in an output voltage of the power converter and calculates the high ripple carrier frequency and the low ripple carrier frequency within a range between the upper limit and the lower limit.

In a third aspect, the present disclosure provides an uninterruptible power supply, including: the controller as set forth in the first aspect; and the power converter as set forth the first aspect, the converter including: a rectifier configured to be connected to a power supply system on an alternative current side; a rechargeable battery connected to a direct current side of the rectifier; and an inverter connected to the rechargeable battery on a direct current side, the inverter being configured to be connected to a load on an alternating current side and including the semiconductor switching device and the filtering reactor on the output side.

In a fourth aspect, the present disclosure provides the uninterruptible power supply according to the third aspect, wherein the carrier calculating unit sets an upper limit and a lower limit of the carrier frequency according to a number of phases in an output voltage of the power converter and calculates the high ripple carrier frequency and the low ripple carrier frequency within a range between the upper limit and the lower limit.

In a fifth aspect, the present disclosure provides a power converter system including: the controller as set forth in the first aspect; and the power converter as set forth in the first aspect in a plurality, connected in parallel, wherein the carrier calculating unit in the controller generates carriers for the respective power converters such that carrier frequencies of all of the power converters are synchronized.

In a sixth aspect, the present disclosure provides the power converter system according to the fourth aspect, wherein the carrier calculating unit sets an upper limit and a lower limit of the carrier frequency according to a number of phases in an output voltage of the power converter and calculates the high ripple carrier frequency and the low ripple carrier frequency within a range between the upper limit and the lower limit.

The present invention, in at least one aspect, makes it possible to normalize the ripple components in the reactor currents across the entire phase angle range in order to spread out the frequencies in the reactor current frequency spectrum and also makes it possible to decrease the magnitude of peaks in the frequency spectrum in order to reduce undesirable magnetostrictive noise.

Moreover, in at least one aspect of the present invention, when using a plurality of power converters connected together in parallel, the carrier frequencies are changed according to a common phase reference signal, thereby making it possible to synchronize the power converter carriers and prevent circulating currents as well as to prevent damage or the like to the power converters.

It is to be understood that both the foregoing general description and the following detailed description are exemplary and explanatory, and are intended to provide further explanation of the invention as claimed.

DETAILED DESCRIPTION OF EMBODIMENTS

Next, an embodiment of the present invention will be described with reference to figures.

Figure 1:
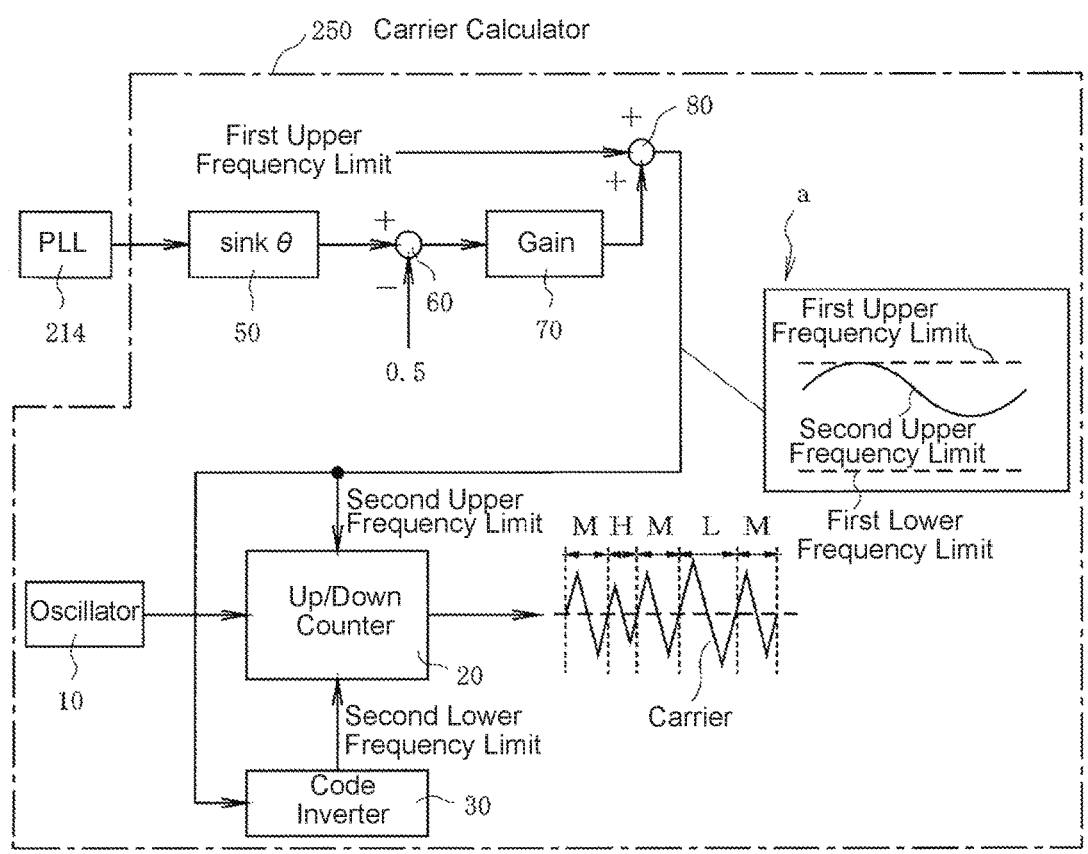
FIG. 1 is a block diagram illustrating a configuration of a carrier calculating unit according to an embodiment of the present invention.

FIG. 1 is a block diagram illustrating a configuration of a carrier calculating unit 250 in a controller according to this embodiment. Note that the overall configuration of the controller is the same as in FIG. 6 except in that the present controller is configured by replacing the carrier calculating unit 215 illustrated in FIG. 6 with the carrier calculating unit 250 illustrated in FIG. 1.

Figure 6:
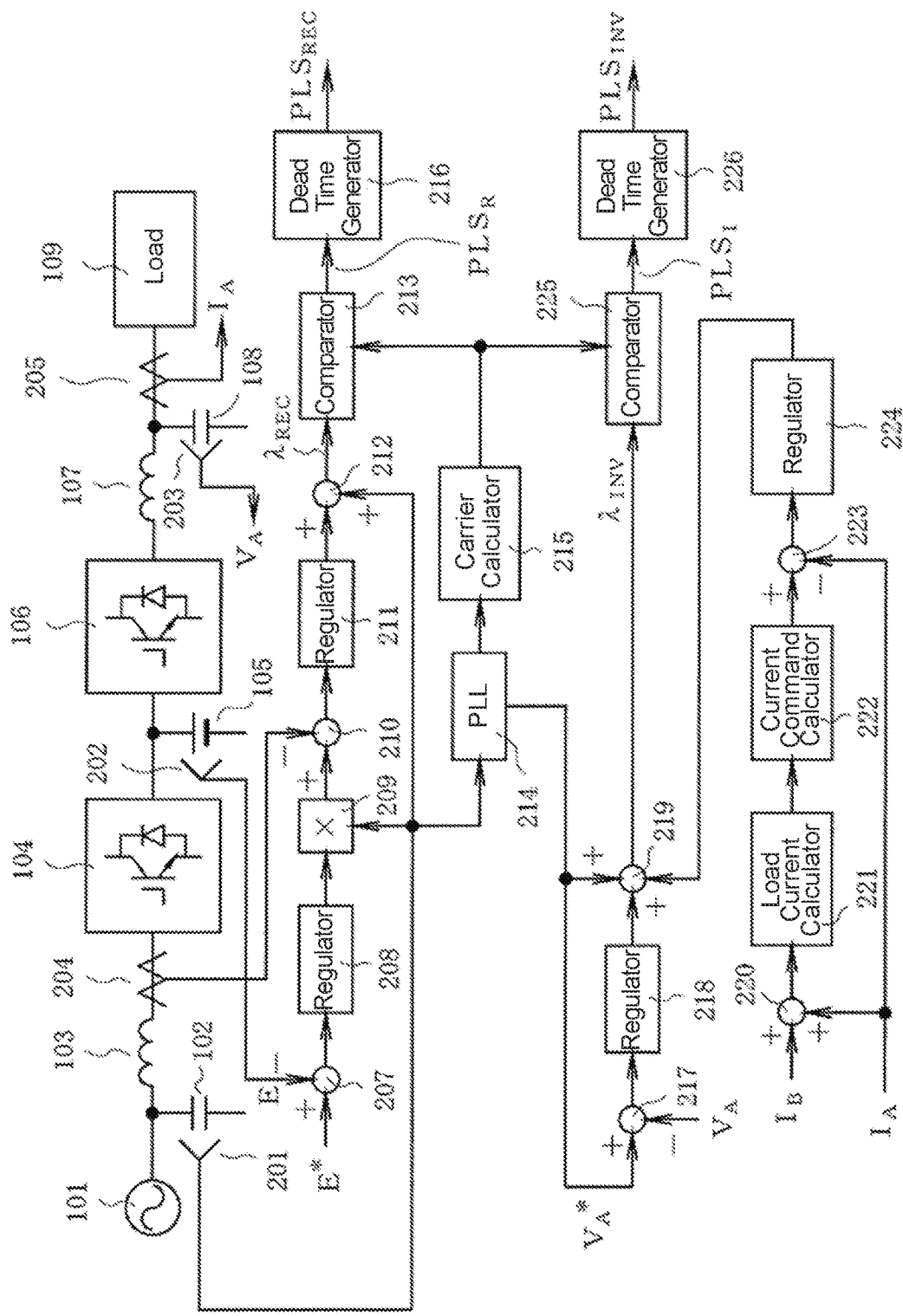
FIG. 6 is a block diagram illustrating controllers for the rectifier converter and the inverter converter illustrated in FIG. 5.

Moreover, the power converter to be controlled is an uninterruptible power supply that includes a rectifier converter 104 connected via a battery 105 to an inverter converter 106 (as illustrated in FIG. 6) and can convert AC power to DC power and then back to AC power.

Figure 9:
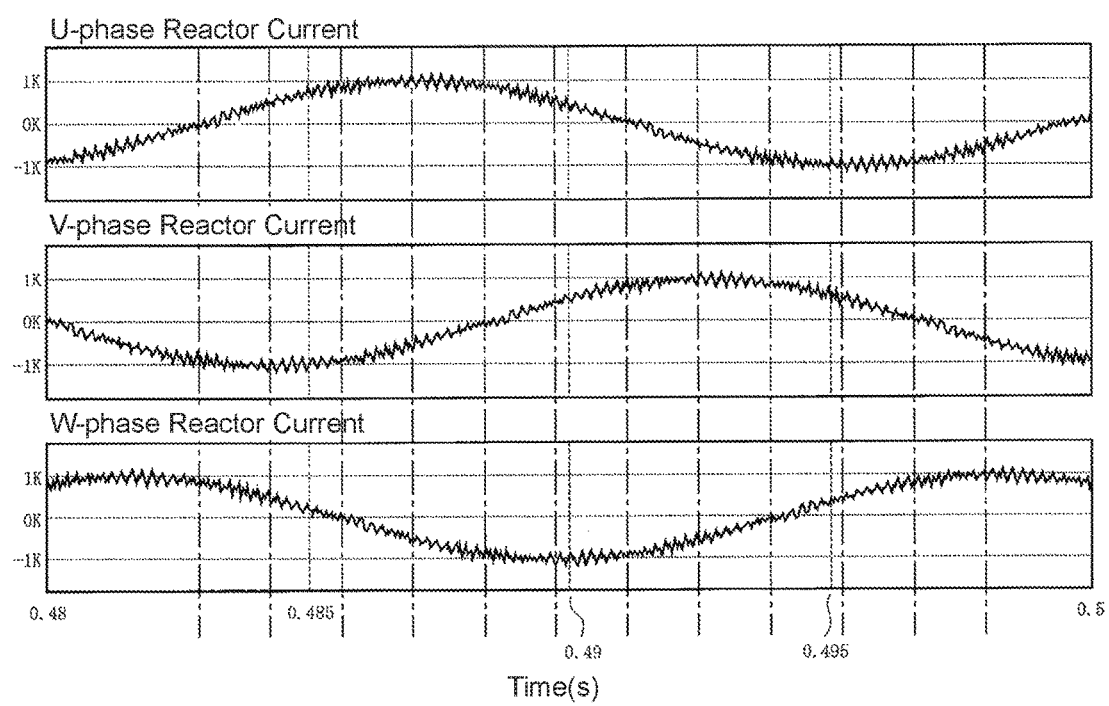
FIG. 9 is a graph showing the reactor current waveforms when the carrier frequency is fixed.

As illustrated in FIG. 1, a phase reference signal output from a PLL circuit 214 is input to a sine wave calculating unit 50. The sine wave calculating unit 50 calculates a sine wave $\sin k\theta$ in which when the inverter converter 106 is a three-phase circuit as illustrated in FIG. 6, k is a multiple of 12 such as 12, 24, and so on, as is clear from the dot-dashed lines in FIG. 9 that are arranged at 30° intervals. Moreover, if the inverter converter 106 is a single-phase circuit, the sine wave calculating unit 50 calculates and outputs a sine wave $\sin k\theta$ in which k is a multiple of 2 such as 2, 4, 6, and so on because the ripple components increase in magnitude at phase angles of 90° and 270°.

Next, a subtractor 60 subtracts 0.5 from the values of the sine wave $\sin k\theta$, and the resulting signal is multiplied with a gain 70 and then input to an adder 80. Here, the gain 70 may be set to any value according to the magnitude of the magnetostrictive noise from the reactors or the desired control performance.

Figure 7:
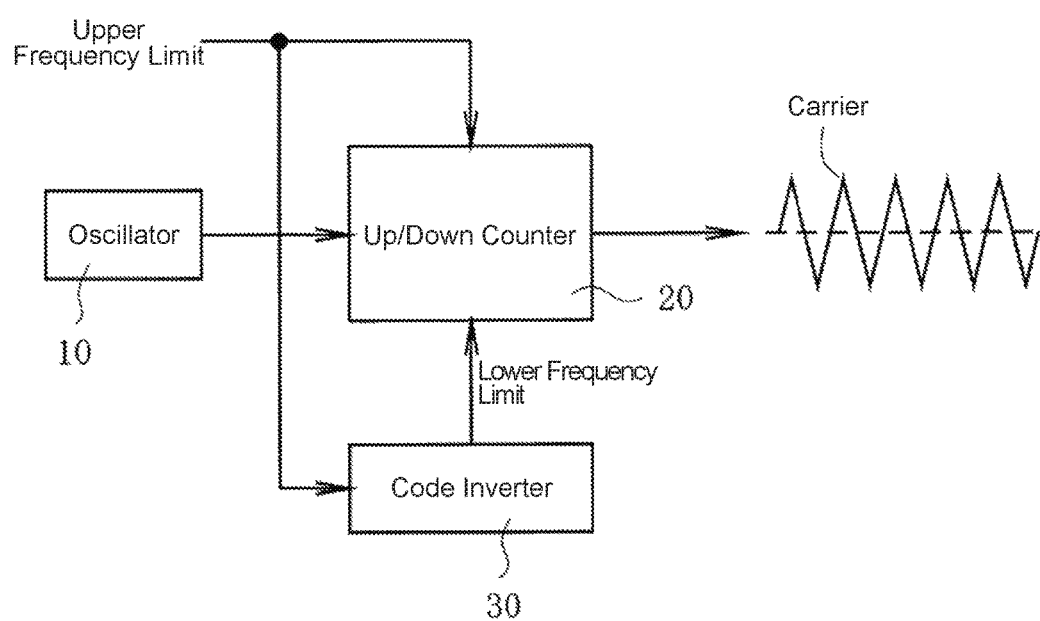
FIG. 7 is a block diagram illustrating a configuration of the carrier calculating unit illustrated in FIG. 6.
Figure 8:
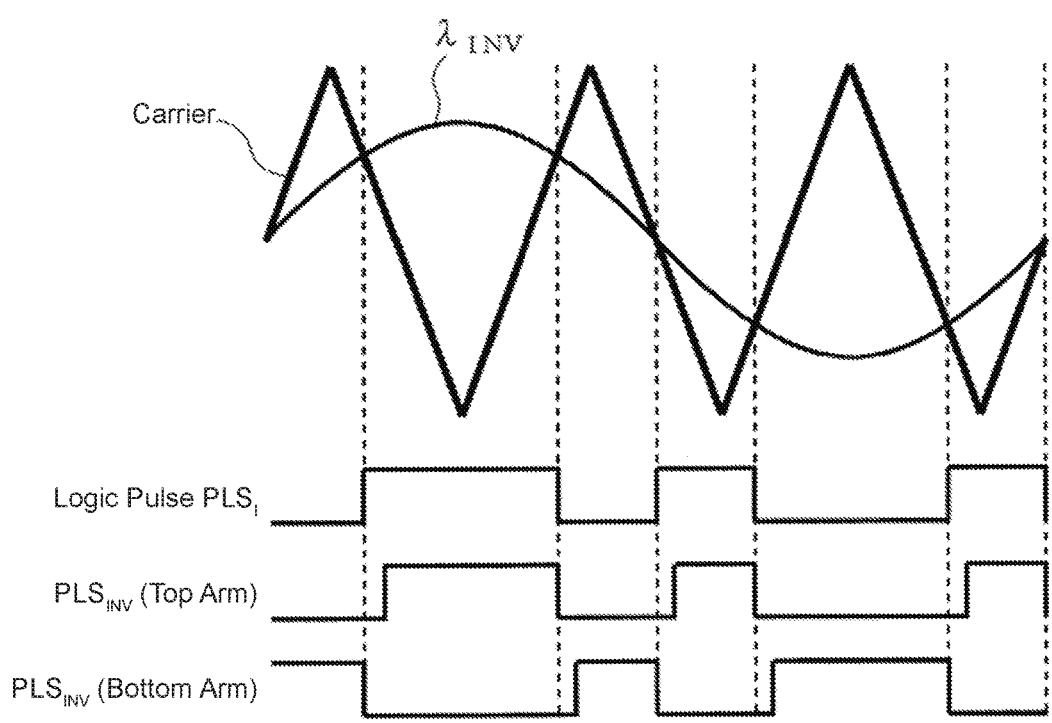
FIG. 8 illustrates a carrier, a voltage command, a logical pulse, and an output pulse on the inverter converter side illustrated in FIG. 6.

The adder 80 adds the signal that was multiplied by the gain 70 to a first upper frequency limit output from the PLL 214 in order to obtain a second upper frequency limit. Here, the first upper frequency limit is the conventional upper frequency limit described with reference to FIG. 7—that is, the upper frequency limit for when the carrier frequency is fixed.

The portion a in the carrier calculating unit 250 illustrated in FIG. 1 conceptually illustrates the first and second upper frequency limits.

The second upper frequency limit is input to an up/down counter 20 as a post-corrected upper limit for the carrier frequency, and a second lower frequency limit output from a sign inverter 30 is input to the up/down counter 20 as a post-corrected lower limit for the carrier frequency.

The up/down counter 20 counts the number of output pulses from an oscillator 10 that are between the second upper frequency limit and the second lower frequency limit.

Figure 2:
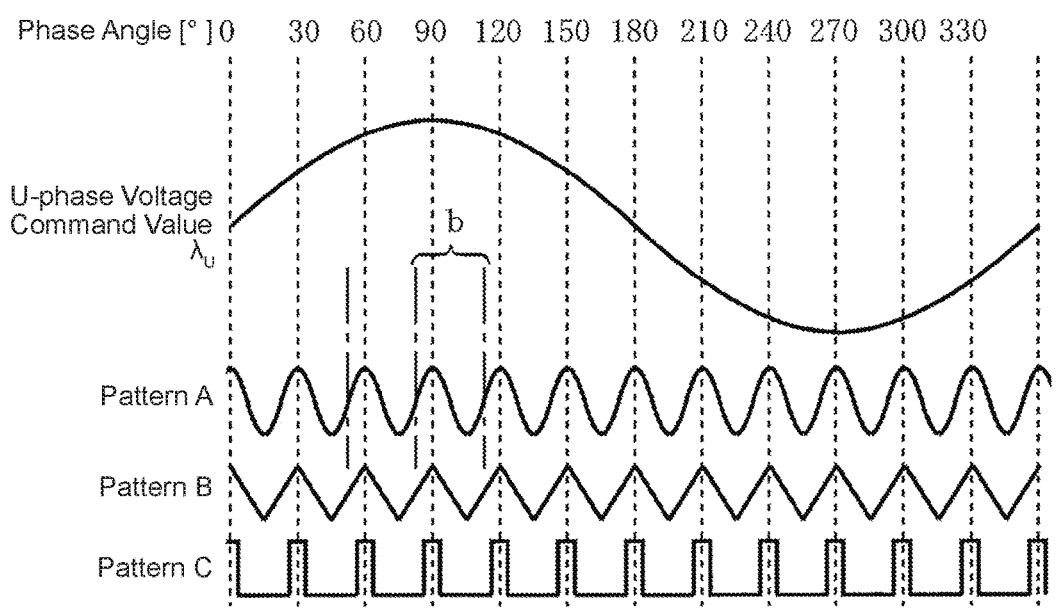
FIG. 2 illustrates a U-phase voltage command and patterns for an upper carrier frequency limit in the embodiment of the present invention.

When the inverter converter 106 is a three-phase circuit, for example, the present embodiment can use a pattern such as pattern A in FIG. 2. In this pattern, the second upper frequency limit is increased at phase angles at 30° intervals (at which the magnitude of the ripple components in the reactor currents increases)—i.e., increasing the difference between the second upper frequency limit and the second lower frequency limit, so as to increase the carrier frequency (below, this carrier frequency will be referred to simply as the "high ripple carrier frequency"). At all other phase angles, the second upper frequency limit is decreased—i.e., decreasing the difference between the second upper frequency limit and the second lower frequency limit, so as to decrease the carrier frequency (below, this carrier frequency will be referred to simply as the "low ripple carrier frequency"). Note that for purposes of comparison, FIG. 2 also illustrates a U-phase voltage command $\lambda_U$ as an example of a voltage command for the inverter converter 106.

FIG. 1 also schematically illustrates the waveform of the carrier output from the up/down counter 20. M represents regions in which the frequency and period have medium values, H represents regions in which the frequency is high and the period is short, and L represents regions in which the frequency is low and the period is long. These changes in the carrier frequency (M→H→M→L→M) occur at the portions b illustrated in FIG. 2, for example.

This makes it possible to increase the carrier frequencies to the high ripple carrier frequency at phase angles at which the ripple components of the reactor currents increase in magnitude, such as at phase angles of 0°, 90°, 180°, and 270° for the U-phase; at phase angles of 30°, 120°, 210°, and 300° for the V-phase (using the U-phase phase angles as references); and at phase angles of 60°, 150°, 240°, and 330° for the W-phase (again using the U-phase phase angles as references). This also makes it possible to decrease the carrier frequencies to the low ripple carrier frequency at all other phase angles, thereby making it possible to normalize the ripple components in the reactor currents across the entire phase angle range.

Figure 3:
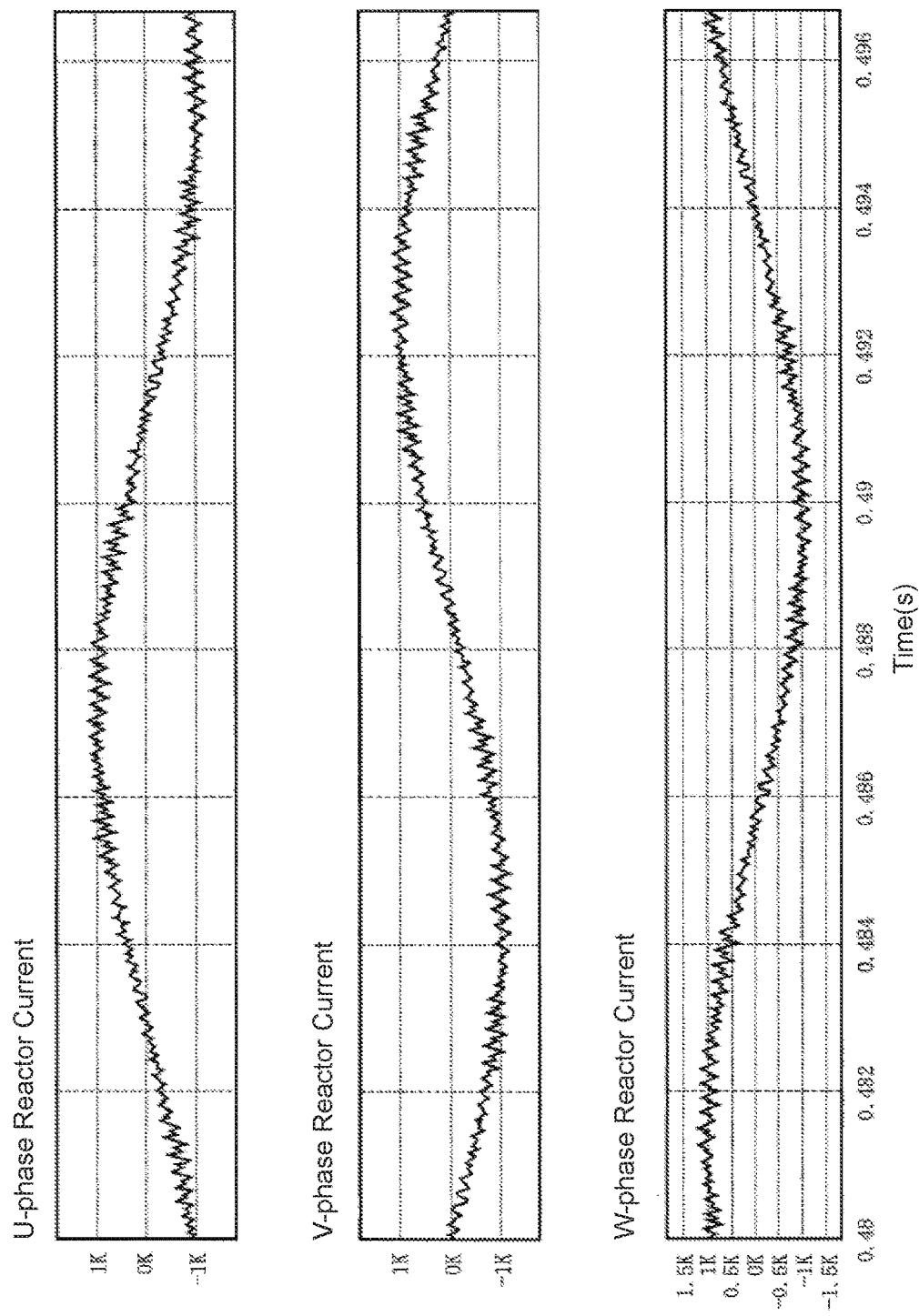
FIG. 3 is a graph showing the reactor current waveforms in the embodiment of the present invention.
Figure 4:
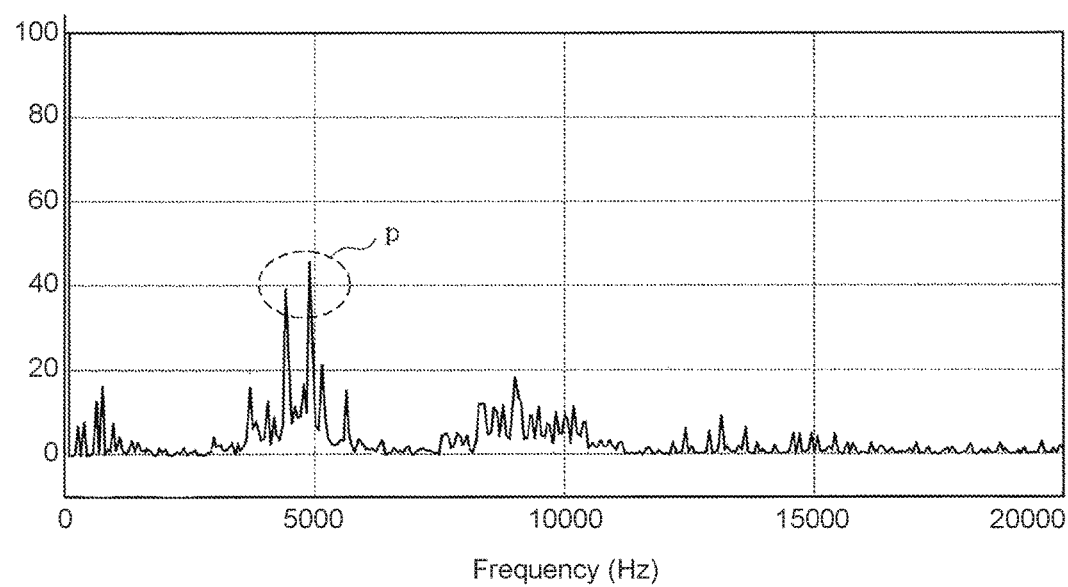
FIG. 4 is a graph showing the frequency spectrum of the reactor currents shown in FIG. 3.

This produces the waveforms shown in FIG. 3 for the reactor currents of each phase, and applying an FFT analysis to these reactor currents yields the frequency spectrum shown in FIG. 4.

Figure 10:
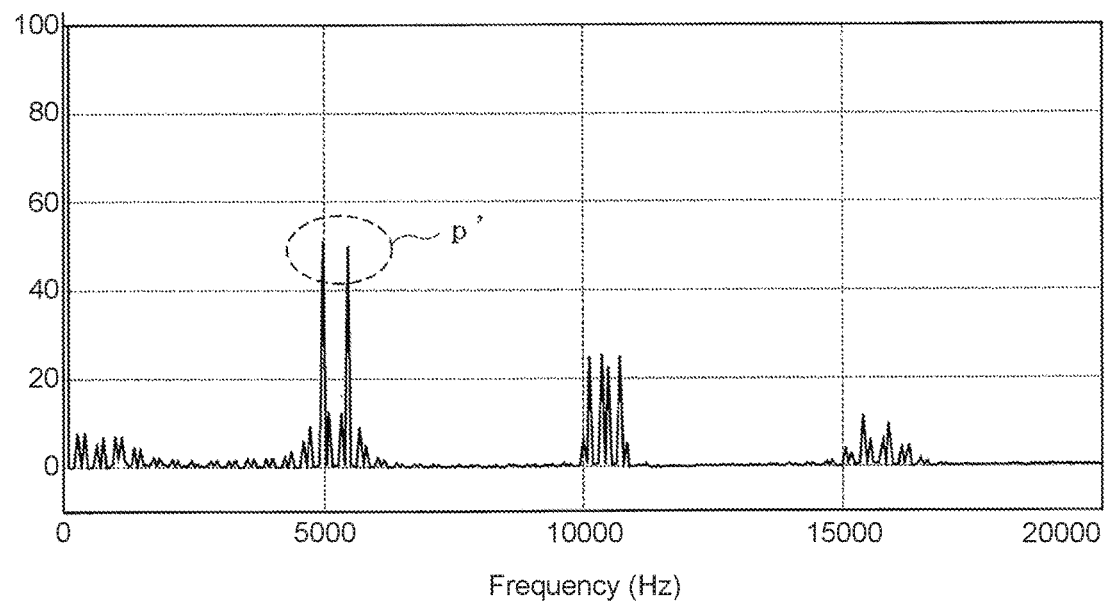
FIG. 10 is a graph showing the frequency spectrum of the reactor currents shown in FIG. 9.
Figure 11:
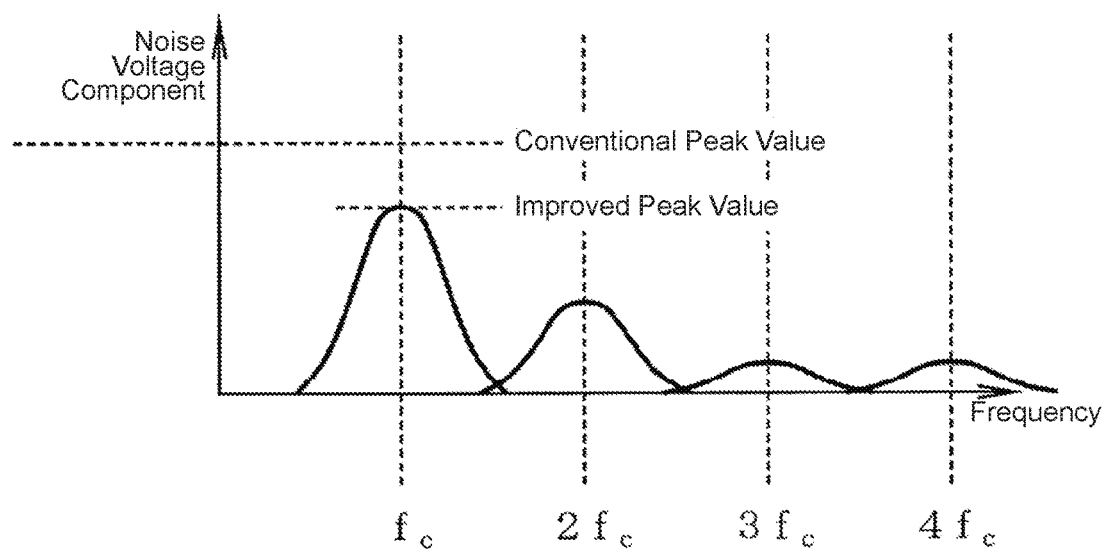
FIG. 11 conceptually illustrates the frequency spectrum of randomly modulated reactor currents.

As shown in FIGS. 3 and 4, normalizing the ripple components in the reactor currents makes it possible to reduce the magnitude of the spectral peaks p in comparison to the peaks p' shown in FIG. 10, thereby making it possible to reduce the undesirable magnetostrictive noise generated by the reactors in comparison to conventional technologies. In particular, the magnitude of the spectral peaks p near 5 kHz in FIG. 4 is reduced in comparison with the peaks p' shown in FIG. 10, which is particularly useful for mid-capacity to high-capacity power converters that utilize carrier frequencies in the audible frequency range.

Furthermore, a pattern other than the abovementioned pattern A such as pattern B or pattern C in FIG. 2 may be selected as the pattern to use for changing the upper limit for the carrier frequency (the second upper frequency limit).

In pattern B, the upper frequency limit increases and decreases linearly, and such a pattern can easily be calculated by replacing the sine wave function sin 12θ in the sine wave calculating unit 50 illustrated in FIG. 1 with a linear function.

In pattern C, the upper frequency limit increases only near phase angles at which the ripple components in the reactor currents of each phase increase in magnitude, and this type of pattern can easily be calculated according to the phase reference signal from the PLL circuit 214.

Figure 5:
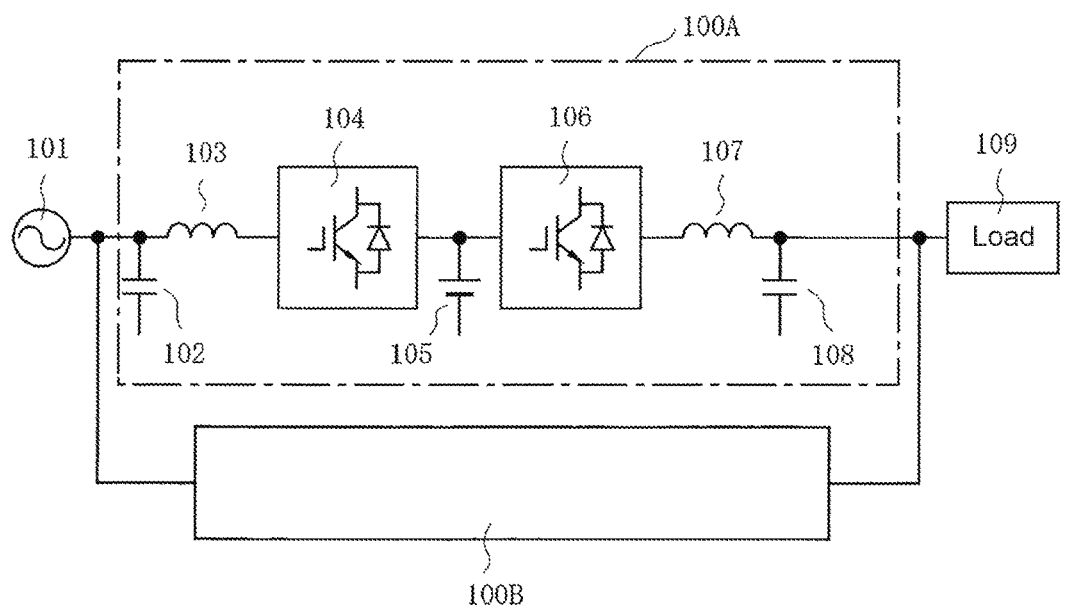
FIG. 5 is a block diagram of a power converter that includes two uninterruptible power supplies connected together in parallel.

Furthermore, the description of the embodiment above assumes that the controller is controlling a single uninterruptible power supply. However, when using a plurality of devices such as the two uninterruptible power supplies 100A and 100B connected together in parallel as illustrated in FIG. 5, the carrier frequencies can be changed according to a common phase reference signal from a PLL circuit, thereby making it possible to synchronize the power converter carriers and prevent circulating currents as well as to prevent accidents such as damage to the power converters.

INDUSTRIAL APPLICABILITY

The present invention, in at least one aspect, can be applied to controllers for mid-capacity to high-capacity power converters that utilize carrier frequencies in the audible frequency range and in which at least the output unit includes a filtering reactor, such as controllers for uninterruptible power supplies.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A controller for a power converter that converts input power to a prescribed form and outputs the power by switching a semiconductor switching device ON and OFF and that has an output circuit including a filtering reactor on an output side, the controller comprising:
    a carrier calculating unit that generates a carrier having prescribed carrier frequencies and that compares the carrier with a command signal generated in accordance with one or more feedback signals so as to generate a control signal that switches the semiconductor switching device ON and OFF,
    wherein the carrier calculating unit generates the carrier such that the carrier has at least a first carrier frequency and a second carrier frequency that is lower than the first carrier frequency, the carrier having the first carrier frequency at predetermined first phase angles where ripple components in a current flowing through the reactor are relatively high in magnitude and having the second carrier frequency at predetermined second phase angles where the ripple components are relatively low in magnitude, said predetermined first phase angles and said predetermined second phase angles being predetermined and fixed, and, as a result, not changeable based on an actual magnitude of the ripple component.

2. The power converter controller according to claim 1, wherein the carrier calculating unit sets an upper limit and a lower limit of the carrier frequencies according to a number of phases in an output voltage of the power converter and calculates the first carrier frequency and the second carrier frequency within a range between the upper limit and the lower limit.

3. An uninterruptible power supply, comprising:
    said controller as set forth in claim 1; and
    said power converter as set forth in claim 1, said converter including:
        a rectifier configured to be connected to a power supply system on an alternative current side;
        a rechargeable battery connected to a direct current side of the rectifier; and
        an inverter connected to the rechargeable battery on a direct current side, the inverter being configured to be connected to a load on an alternating current side and including said semiconductor switching device and said filtering reactor on the output side.

4. The uninterruptible power supply according to claim 3, wherein the carrier calculating unit sets an upper limit and a lower limit of the carrier frequencies according to a number of phases in an output voltage of the power converter and calculates the first carrier frequency and the second carrier frequency within a range between the upper limit and the lower limit.

5. A power converter system comprising:
said controller as set forth in claim 1; and
two or more of said power converter as set forth in claim 1, connected in parallel,
wherein the carrier calculating unit in said controller generates carriers for the respective power converters such that the carrier frequencies of all of the power converters are synchronized.

6. The power converter system according to claim 5, wherein the carrier calculating unit sets an upper limit and a lower limit of the carrier frequencies according to a number of phases in an output voltage of the power converter and calculates the first carrier frequency and the second carrier frequency within a range between the upper limit and the lower limit.

7. The power converter controller according to claim 1, wherein the carrier calculating unit generates the carrier such that a frequency of the carrier is modulated in accordance with a predetermined periodic modulation pattern having a frequency that is an integer multiple of a frequency of the current flowing through the reactor so as to generate the carrier that has said at least the first carrier frequency and the second carrier frequency.

* * * * *